United States Patent [19]

Airey et al.

[11] 4,297,213

[45] Oct. 27, 1981

[54] APPARATUS FOR SEPARATING AND CONTACTING FRIABLE PARTICULATE ORGANIC MATTER FROM AND WITH LIQUIDS

[76] Inventors: Frederick K. Airey, "Swanlands", Hilltop La., Chinnor Hill, Chinnor, Oxon; Arthur R. Evans, Well House, Hopton, Nesscliffe, both of England

[21] Appl. No.: 100,988

[22] Filed: Dec. 6, 1979

[30] Foreign Application Priority Data

Dec. 6, 1978 [GB] United Kingdom ............... 47413/78

[51] Int. Cl.$^3$ ............................................. B01D 25/04
[52] U.S. Cl. ................................. 210/195.1; 210/196; 210/255; 210/323.1; 426/491; 99/456
[58] Field of Search ........... 210/409, 499, 322, 323 R, 210/262, 255, 194–197; 426/491; 99/456, 458, 459, 453

[56] References Cited

U.S. PATENT DOCUMENTS

| | | | |
|---|---|---|---|
| 1,320,324 | 10/1919 | Dunkle | 210/262 |
| 1,988,612 | 1/1935 | Stinot | 210/255 |
| 3,169,111 | 2/1965 | Rose et al. | 210/499 |
| 3,452,876 | 7/1969 | Ginaven | 210/409 |
| 3,777,893 | 12/1973 | Ginaven | 210/499 |
| 4,113,626 | 9/1978 | Detcher | 210/409 |

FOREIGN PATENT DOCUMENTS 1087399 8/1960 German Democratic Rep. ... 99/459

*Primary Examiner*—Benoit Castel
*Attorney, Agent, or Firm*—Gipple & Hale

[57] ABSTRACT

The invention is concerned with the treatment of friable particulate organic matter such as cottage cheese curd or casein with liquids as by separation of the matter from the liquid in which it may be formed (e.g. whey) and further contacting with a liquid (e.g. a wash liquid such as water), the apparatus being designed to minimize break up of particles into "fines". This is achieved by providing an even non-turbulent flow of friable matter through a series of liquid contacting and separation zones. The separation of the friable matter from liquid is effected on perforate concave screens the perforations of which have outlets larger than their inlets, each screen being disposed in a generally downward direction immediately following a contacting zone in the form of a trough, each screen feeding separated matter into the next trough. The first trough may be solely the deceleration of the liquid.

6 Claims, 4 Drawing Figures

TO WASTE
WASH LIQUID

APPARATUS FOR SEPARATING AND CONTACTING FRIABLE PARTICULATE ORGANIC MATTER FROM AND WITH LIQUIDS

DESCRIPTION

The present invention relates to an apparatus for separating from and contacting with a liquid, friable particulate matter of organic origin such as cheese curd or casein.

In the methods and apparatus hitherto used for separating from and contacting with a liquid (e.g. for washing and/or cooling, friable organic material) the principal problem has been the formation of very fine particles called "fines" by break up of the particles of friable material. For washing such friable matter large volumes of liquid (usually water) have hitherto been necessary together with continuous agitation particularly when cooling is also being effected. Such agitation produces "fines", a proportion of which are lost during subsequent processing and the presence of which results in a less satisfactory product.

The large volumes of wash liquid hitherto required, especially when the liquid requires preheating to avoid imparting thermal shock to the particles of friable matter and/or when chemical pretreatment of the wash liquid is necessary, makes a significant contribution to the overall cost.

It is an object of the present invention to provide an apparatus in which the agitation is at least materially reduced so as to minimize the formation of "fines". It is also an object of the present invention to provide such a method and apparatus in which the amount of liquid required is also considerably reduced.

According to the present invention a method is provided for separating and contacting with a liquid (e.g. for washing and if necessary cooling) friable particulate matter of organic origin which comprises transporting a mixture of said particulate matter with a carrier liquid at a constant flow rate to a separation zone, slowing the rate of flow of said mixture immediately before entry thereof into said separation zone while maintaining an even, non-turbulent flow of said mixture, passing said mixture over a first perforate screen disposed in said separation zone to separate said carrier liquid from the the particulate matter and subsequently passing the separated particulate matter through a series of contacting zones wherein the separated particulate matter is contacted with a liquid. The liquid is separated from the particulate matter after each contacting zone by passing each successive mixture of particulate matter and liquid over a perforate screen disposed downstream of each contacting zone and in which the perforations in each perforate screen have outlets larger than the inlets thereof.

The carrier liquid may be the liquid in which the particulate matter is formed. Thus in the case of cheese curd it would be whey. The liquid with which the friable matter is contacted may be a wash liquid which may be water. The water may be chemically treated as for example by chlorination or for adjusting pH. The perforate screens are preferably milled screens or are constructed of wedge wire, it being necessary for the outlets of the perforate screen to be larger than the inlets to reduce the possibility of any particulate material passing through the inlets and clogging the screen, the larger outlets causing such particulate material to pass through the screen.

The expression "particulate matter" as used herein is to be understood as including matter composed of particles which have diameters or width of several millimeters such as for example those occurring in cottage cheese curd.

The present invention also provides an apparatus for contacting and separating a liquid and friable particulate matter of organic origin which comprises a series of alternate troughs or retention tanks and perforate screens, supply means for supplying a mixture of carrier liquid and friable particulate matter to the first trough, further supply means for supplying a liquid to each trough after the first trough preferably to the bottom of each trough, and collecting means for receiving separated friable matter from the last perforate screen in the series. The perforate screens are concave and disposed with a generally downward slope immediately downstream of each trough to separate liquid from a mixture of liquid and friable matter overflowing from the immediately preceding trough. Receiving means is associated with each perforate screen for receiving liquid passing through its associated perforate screen and in which the outlet of each perforation in each perforate screen is larger than the inlet thereof.

The outlet of each trough preferably constitutes a weir over which the mixture of liquid and friable matter passes onto the next perforate screen.

The supply means e.g. centrifugal pumps, for supplying liquid to each trough after the first may themselves be associated with the receiving means associated with each of the screens, each of the receiving means after the first being connected by one of the supply means to the trough next but one upstream from the screen associated with that supply means. The collecting means associated with the first screen may have associated transporting means for transporting liquid collecting in said collecting means. The first receiving means associated with the second screen may also have transporting means for conveying liquid received in said receiving means to any desired location. Such a construction is preferred when friable matter separated by the first screen is to be successively washed with same wash liquid particularly when the friable matter is initially at an elevated temperature and requires gradual cooling without thermal shock.

The first trough or retention tank may itself constitute a deceleration means for slowing the rate of flow of the mixture of carrier liquid and friable matter before it passes over the first perforate screen. Thus the first trough or retention tank may take the form of a funnel whose cross-sectional area increases in a controlled manner such that the rate of flow of the mixture entering the trough is reduced to a substantially zero flow rate at the outlet thereof and such that turbulence in the mixture which could cause break up of the particles of particulate matter is avoided.

The invention will now be more particularly described by reference to the separation of cottage cheese curd from its associated whey and the subsequent washing and simultaneous cooling of the separated curd. The conventional process will be first described and the problems extant in that process.

The conventional cottage cheese process results in the production of small curd particles suspended in whey; these curds and whey are then heated or "scalded" to promote further whey expulsion and to toughen the curd particles. Following this scalding the curd particles have then to be washed and chilled and this is typically achieved as follows:

1. A sieve is placed across the cheese vat outlet in order to retain the curd particles, and a proportion of the whey, now at approximately 54° C., is drained off. The outlet valve is then closed and the drained whey is replaced with an equivalent quantity of temperate (21° C.) wash water, and vat agitation initiated.
2. When temperature equilibrium is reached the outlet is again opened and all of the whey/water is drained from the vat. Temperate 21° C. wash water is again introduced and sufficient quantity admitted to the vat to just completely cover the curd particles; agitation of the vat contents again takes place.
3. When equilibrium is again reached the outlet is opened and all of the water released. Chilled 4.5° C. wash water is now admitted to complete the chilling of the curd, the temperature being reduced to 4.5° C.–7° C.

The above describes a typical washing chilling situation but there are no bard and fast rules and the combinations of temperate and chilled water may vary considerably from manufacturer to manufacturer. Temperate water is not essential and is only used to reduce thermal shock to the curd and give a controlled temperature gradient. The main disadvantages of this process are:

1. The large volume of wash water used.
2. Damage to the fragile curd by repeated manual and mechanical agitation.
3. The time this operation takes is non-productive vat usage time.

1. Wash water usage

The large volume of water used is due primarily to the necessity of adding a volume of water over and above that needed to cool the curd in order to allow the curd to be agitated and suspended. Added to the cost of this additional water may be the cost of its chemical treatment, the water used in the above washing process being also chlorinated and acidified.

2. Curd damage

The continuous agitation used to reduce the localized thermal shock and maintain the temperature equilibrium created curd "fines" (i.e. broken curd pieces) a proportion of which are lost in subsequent processing, resulting in loss of valuable milk solids, and production of an unsatisfactory final product.

3. Vat utilization

The above draining/washing operation utilizes the vat for a period of approximately 1½/2 hours each cycle.

If this operation were carried out externally, the vat cycle time could be reduced by an equivalent amount, hence leading to increased production potential.

SUMMARY OF THE INVENTION

The present invention provides an apparatus which eliminates or reduces the above constraints. Utilizing the apparatus of the present invention the mixture of curds and whey are drained from the vat at a controlled flow rate and, in a non-turbulent manner, decelerated and passed into a first trough the outlet of which provides a weir over which the mixture passes onto a downward-sloping, concave, perforate member. The whey passes through the perforate member and the curd is carried over the perforate member into a second trough or retention tank. Wash water entering the bottom of the second trough washes and lifts the curd over the weir forming outlet of the second trough onto a second perforate member, again the water passes through the perforate member and the curd is carried over into a third trough or retention tank. Again, bottom entry water washes and lifts the curd over a third weir on to a third perforate member and the operation is repeated in a fourth trough or retention tank and a fourth perforate member. The curd at this point has been washed and cooled to 4.5°/5.5° C. ready for blending.

The cooling is achieved by using the same water for each lift and movement. 4.5° C. water is bottom fed into No. 4 retention tank, it carries the curd over weir No. 4 and on to the fourth perforate member. The water falls through the perforate member is collected and pumped to No. 3 retention tank. At this point the water temperature has risen due to exchange of heat from the curd while in contact therewith within No. 4 tank. This process is repeated from perforate member 3 to retention tank 2. The water temperature has now risen to +32° C. After passing through No. 2 perforate member it is allowed to drain away to waste.

The separation of whey from the curd is thus effect on the first perforate member and the successive washing operations are effected on successive perforate members. To avoid preheating the wash water preferably the same wash-water is used in each washing operation, chilled, (and if necessary chlorinated and acidified) water is used for the last washing operation and then reused for the penultimate and so on, the temperature thereof being successively raised by contact with the hot curd which is thereby gradually cooled.

The present invention is further described hereinafter, by way of example, with reference to the accompanying drawings, in which:

DETAILED DESCRIPTION OF THE DRAWINGS

A preferred system for producing cottage cheese is illustrated in FIGS. 1 through 4 and comprises a cheese vat 10, typically 9000 liters capacity, coupled via a flow control unit 12 to a washing apparatus 14.

The mixture of curd and whey is prepared in the vat 10, but in contrast with hitherto known processes, only the separation of a proportion of the whey and replacement thereof with temperature water is effected in the vat. The agitation of the curd in the vat which necessarily accompanies separation and washing is therefore considerably reduced if not eliminated, with consequent minimizing of fines produced in the vat, and the resulting higher yield of curd mixed with whey/water is fed to the washing apparatus 14.

Because the curd is very susceptible to breakage with the consequent production of fines and flow rate from the vat 10 must be carefully controlled and this is effected by the flow control unit 12. Optimum performance of the system requires a constant flow rate from the vat 10. However, the flow rate is in part dependent upon the static head of the mixture in the vat 10 and this of course varies as the vat slowly empties. The flow control unit 12 is therefore designed to restrict the flow of the mixture from the vat to provide a resulting constant flow equivalent, for example, to a constant static head of approximately 100 mm which could give a preferred stable flow rate of 27,300 liters/hour.

Normal methods of restricting flow, for example by use of valves or orifice plates, have proved unsuitable since the pressure difference generated across the valve or orifice plate tends to cause curd fracture with resulting fines.

Figure 1:
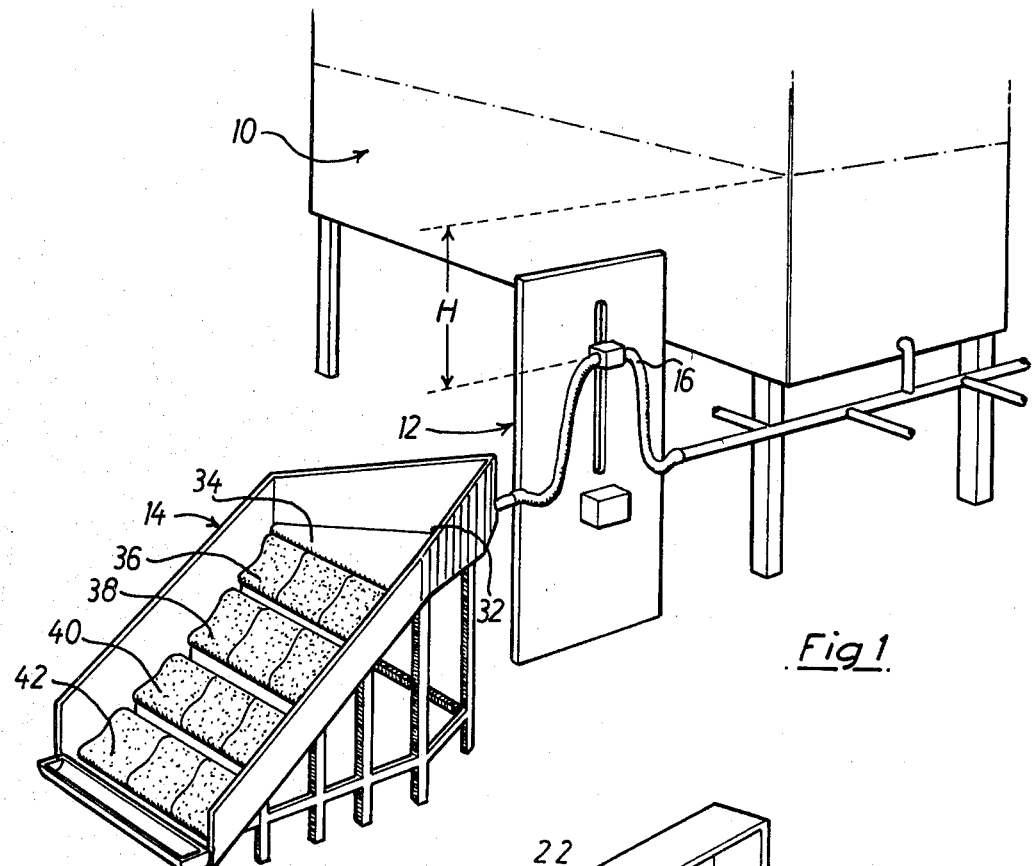
FIG. 1 is a perspective illustration of a system for carrying out the process according to the present invention.
Figure 2:
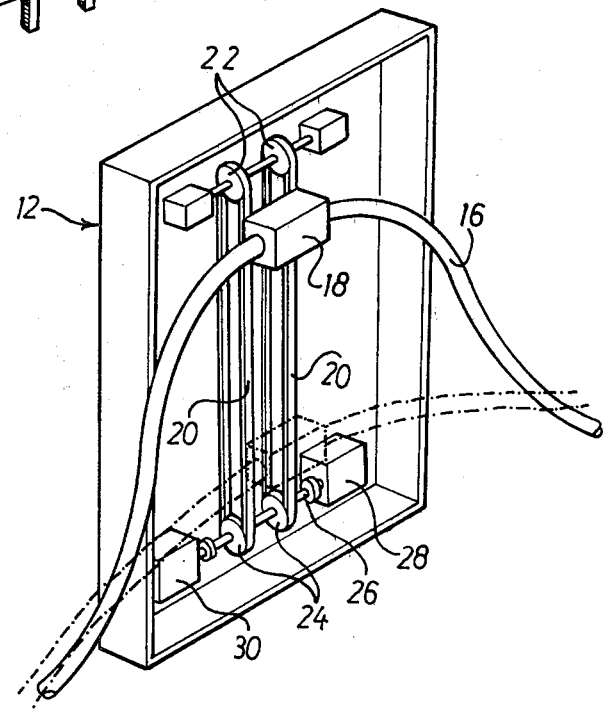
FIG. 2 is a perspective view of a flow control unit of the system of FIG. 1.

The flow control unit 12 therefore, as is best seen in FIG. 2, provides a further static head which opposes that in the vat 10 by elevating a small portion 16 of the flexible piping connecting the vat 10 to the washing apparatus 14. The flow control unit 12 varies the elevation of the piping portion 16 so as to maintain it at a vertical separation of 10 mm below the level of the mixture in the vat 10.

The portion 16 is mounted in a support 18 which is vertically driven on one or more (two being shown) endless belts or chains 20 entrained round upper and lower pulleys or sprockets 22, 24. The lower pulleys or sprockets 24 are mounted on a shaft 26 driven alternately by geared motors 28 and 30. The motor 28 controls the lowering of the portion 16 in conformity with the drop in the mixture level in the vat 10. Control of the motor 28 can be effected by way of a differential transmitter (not shown) which compares the levels of the mixture and the portion 16 and adjusts the position of the latter in dependence upon the comparison. Alternatively, the motor can be controlled by a timing circuit set to lower the portion 16 the required distance in a set time. For example in a vat holding 9000 liters, a flow rate of 27,300 liters/hour will empty the vat in 20 minutes. If the motor 28 were set to lower the portion 16 from maximum to minimum elevation in this time a constant flow rate would be maintained.

The motor 30 is geared to the shaft 26 to return the portion 16 to its elevated position in a suitably short period e.g. 5 seconds.

The completely open pipe potion 16 has no mechanical restrictions to cause curd breakage and it has been found that even with fragile curd very little damage is caused by a flow rate of 27,300 liters/hour in a 76 mm diameter pipe, providing the curd has a whey/water carrier.

The mixture flows from the flow control unit 12 to the working apparatus and here it is important to decelerate the mixture without damaging the curd. This is achieved by a velocity breaker 32 (best seen in FIGS. 3 and 4) of the washing apparatus 14. The velocity breaker 32 is in the form of a funnel whose cross-sectional area increases in a controlled manner such that turbulence in the mixture which would normally cause curd breakage is avoided. This velocity breaker here constitutes the first trough or retention tank of the apparatus of the invention.

Figure 3:
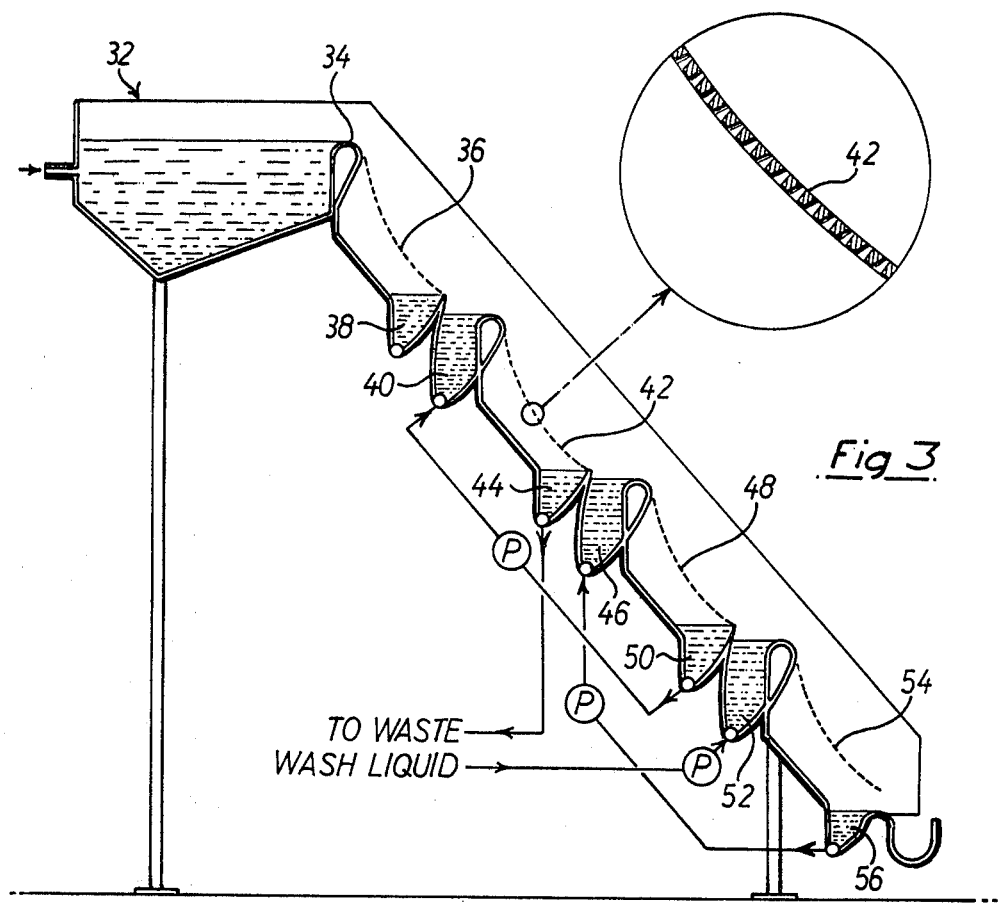
FIG. 3 is an enlarged side elevation partially in cross-section of a washing apparatus of the system of FIG. 1.
Figure 4:
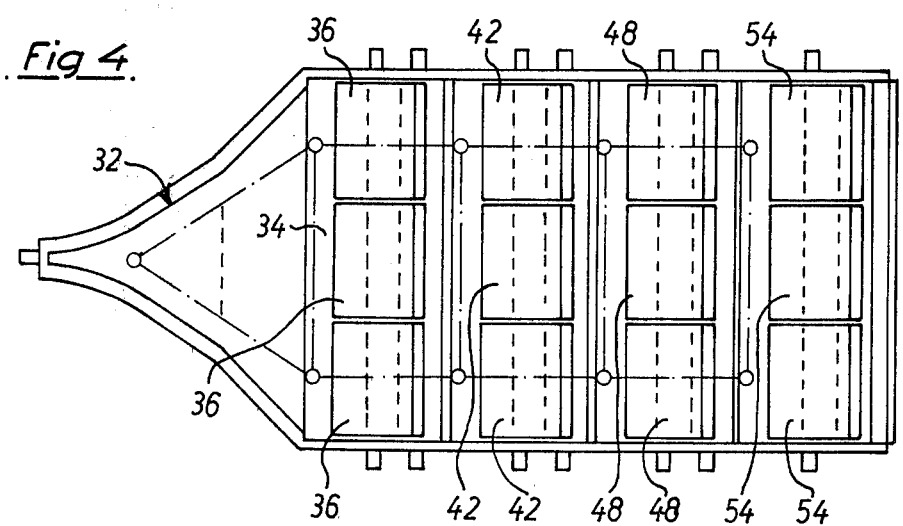
FIG. 4 is a plan view of the washing apparatus of FIG. 3.

Referring to FIGS. 3 and 4 the curd and whey/water mixture passes through the velocity breaker and is discharged over a substantially 1.8 meter weir unit 34 at effectively zero velocity onto a first perforate screen in the form of three paralleled and arcuate shaped wedge wire screens 36, in a separation zone. The wedge sections of the screens are substantially triangular and set at 0.5 mm clearance. Here the curd is separated from the whey/water carrier, the arcuate shape of the screens giving a dewatering/separation effect and the build up of curd at the base of the screen giving a required slight pressure for whey separation. The outlets from the perforate screen are necessarily larger than the inlets to prevent any curd passing through the inlets from remaining in the screen and thus clogging the screen.

The whey/water is collected in a receiving tank 38 and approximately 20% of the separated whey/water is returned to the vat 10 to serve as additional carrier medium at the end of the vat run and to assist in curd clearance.

Washing and separation of the curd is effected by three further pairs of troughs and perforate screens each screen comprising three paralleled and arcuate shaped wedge wire screens 42, 48, 54 and each at a lower elevation than the preceding screen. As will be obvious the curd travles from the screens 36 through trough 40 to screens 42, then trough 46 and screen 48 and then trough 52 and screens 54. Water for washing the curd, however, is placed firstly into the bottom of trough 52, then via receiving tank 56 into trough 46 and lastly via receiving tank 50 into trough 40. Water from receiving tank 44 is drained to waste. This has the advantage that the curd is washed three times using the same water which is relatively cool as trough 52 and increases in temperature as heat transfer from the curd takes place to provide a temperature first wash at screens 42. The curd has to be cooled gently to prevent edge brittling. The wash water is pumped by centrifugal pumps P shown schematically in lines in FIG. 3, between the various troughs.

In a preferred example of the process 7300 liters/hour of 4.5° C. acidified and chlorinated wash water is pumped into the bottom of trough 52 giving the curd a final wash and reducing the curd temperature to approximately 6° C. the wash water temperature has been raised to approximately 12° C. during the wash passes through screens 54 into receiving tank 56 and is pumped from receiving tank 56 via an indirect heater (not shown), e.g. steam heater which adjusts the water temperature (which has already been raised by contact with the curd) to an optimum for the second wash in trough 46. Best results appear to be obtained 15.5° C. at this stage.

The wash water in trough 46 carries the curd onto the screens 48 and drains into receiving tank 50 at approximately 26.5° C. From tank 50 the water is pumped via a second heater (not shown), which raises the temperature to approximately 32° C. to the bottom of trough 40 which washes the curd and carries it (at approximately 126° F.) onto screens 42.

The angles of inclination of the screens 36, 42, 48 and 54 can be adjusted to vary the water content of the curd throughout the separation and washing process.

The advantages of the invention are (a) throughout the whole process the curd has been water carried and hence physical damage minimized; (b) thermal shock is minimized by the use of contra-flow water; (c) water usage is greatly reduced and (d) vat cycle time can be reduced considerably.

In expermental trials the following savings have been observed using the process according to the present invention.
1. Vat cycle time is decreased by 15 to 20% and
2. Water usage is reduced from 13950 liters per ton of dried curd using a conventional process to 1790 liters per ton.
3. The conventional process uses approximately 680 megajoules per ton of dried curd for heating and cooling whereas the method of the invention uses only about 130 megajoules per ton of dried curd providing a saving of 550 megajoules per ton of dried curd.

What is claimed is:

1. An apparatus comprising a series of troughs or retention tanks positioned on different levels to operate in a cascade fashion provided with peforate screens, supply means for supplying a mixture of carrier liquid and friable particulate matter to a first trough, collecting means for receiving separated friable matter from the last perforate screen in the series; said perforate screens being concave and disposed with a generally downward slope immediately downstream of each trough to separate liquid from a mixture of liquid and friable matter overflowing from the immediately preceding trough, a trough receiving means associated with each perforate screen for receiving liquid passing through its associated perforate screen, the outlet of each perforation in each perforate screen being larger than the inlet thereof and a recycling supply means for supplying liquid to each of said troughs after the first trough, said recycling supply means being associated with each trough receiving means and connecting its associated trough receiving means with the trough next but one upstream of said associated receiving means.

2. An apparatus as claimed in claim 1 wherein each trough or retention tank has an outlet constituting a weir immediately adjoining the perforate screen downstream of said trough and adapted to direct a mixture of liquid and friable matter overflowing from said trough onto said perforate screen.

3. An apparatus as claimed in claim 1 or 2, in which the first trough or retention tank is formed in the shape of a funnel having an inlet and an outlet and whose cross-sectional area increases from the inlet to the outlet thereof in a manner adapted to cause a continuous reduction in the flow rate of a mixture entering said trough at a predetermined flow rate to a substantially zero flow rate at the outlet of said trough while maintaining a non-turbulent flow of said mixture in said trough.

4. An apparatus as claimed in any of claims 1 or 2, in which the connection between each recycling supply means and the trough it supplies is such that the mixture of liquid and friable matter enters at or near the bottom of the said trough.

5. An apparatus for separating friable particulate matter from a liquid carrier comprising a series of descending connected retention assemblies adapted to transport the friable particulate matter in a cascade manner, each retention assembly comprising an upper wash trough and a lower drain trough and screen means extending over said drain trough to the lip of the next higher wash trough, said screen means comprising a concave shaped perforated screen structure disposed with a generally downward slope, each perforation of said screen structure being formed with a larger exit aperture than the inlet aperture, liquid recycling means connecting the drain trough of each retention assembly excluding the first retention assembly with the wash trough of the adjacent higher assembly, supply means for supplying a mixture of carrying liquid and friable particulate matter to the highest retention assembly, drain means connected to at least one of said drain troughs for draining liquid away, wash supply means connected with one of the lower wash troughs to provide a separate wash liquid to said wash trough and collecting means for receiving separated friable matter from the screen means of the last retention assembly.

6. An apparatus as claimed in claim 5, in which the first trough or retention tank is formed in the shape of a funnel having an inlet and an outlet and whose cross-sectional area increases from the inlet to the outlet thereof in a manner adapted to cause a continuous reduction in the flow rate of a mixture entering said trough at a predetermined flow rate to a substantially zero flow rate at the outlet of said trough while maintaining a non-turbulent flow of said mixture in said trough.

* * * * *